March 9, 1954     T. M. GORDON, JR     2,671,643
CONSTANT TEMPERATURE BOX
Filed Oct. 18, 1949
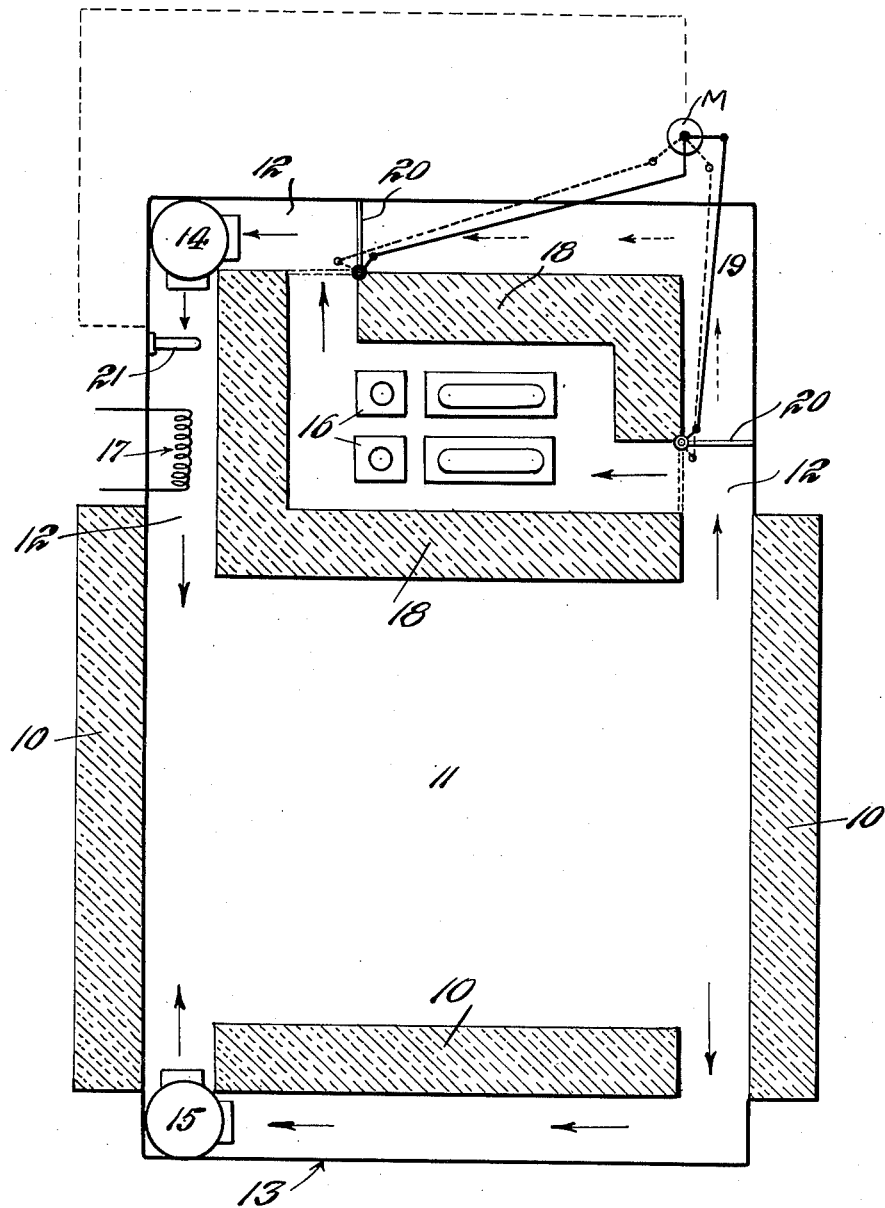
INVENTOR.
Thurlow M. Gordon, Jr.
BY
Byerly, Townsend & Watson
ATTORNEYS Patented Mar. 9, 1954

2,671,643

UNITED STATES PATENT OFFICE 2,671,643

CONSTANT TEMPERATURE BOX

Thurlow M. Gordon, Jr., Brookfield, Conn.

Application October 18, 1949, Serial No. 122,097

1 Claim. (Cl. 257—3)

This invention relates to a constant temperature box which is of especial value for storing biological materials which must be kept at an accurately controlled temperature.

In constant temperature boxes, it has been customary to provide a thermostatically controlled electric heating element, but considerable difficulty has been encountered in obtaining accurate temperature control in this manner owing to the inertia or residual effect of a heating element after the heating current has been turned off. In accordance with my invention, this difficulty is avoided by maintaining a heating element in constant operation and intermittently withdrawing heat from the air in the chamber.

The accompanying drawing is a diagrammatic sectional view of a constant temperature box embodying my invention.

The device illustrated includes an insulating casing 10 enclosing a storage chamber 11. U conduits 12 and 13 are connected at spaced points in opposite walls of the chamber. These conduits enclose volumes of air many times smaller than the volume of air in the chamber. Rapid circulation of the air in the chamber through the two conduits is provided by blowers 14, 15 in the two conduits. The discharge ends of the two conduits are directed towards each other so that the air re-entering the chamber from the two conduits is thoroughly mixed.

The upper conduit 12 contains temperature controlling means. Cooling elements, such as refrigerated tubes 16 with fins, and an electric heating element 17 are located in series in the conduit 12. Both the heating and cooling means are maintained in constant operation. The portion of the conduit containing the cooling elements is most desirably protected by insulation 18 as shown.

The heating element 17 supplies heat to the air passing through the conduit 12 at a constant rate. The cooling elements 16 withdraw heat from the air passing through the conduit 12 intermittently. For this purpose, a by-pass conduit 19 extends around the portion of the conduit 12 containing the cooling elements 16. Dampers 20 at each end of the by-pass provide for causing the air in the conduit to flow either over or around the cooling elements 16. The dampers are operated in known manner by a thermostatically controlled motor M so as to direct the air over the cooling elements when the temperature rises above a predetermined point and around the cooling elements when the temperature falls below said point. The controlling thermostat 21 is most desirably located in the conduit 12 beyond the by-pass 19 and in advance of the heating element 17, as this position makes it most sensitive by subjecting it directly to the air which has just passed over or around the cooling elements 16. It may, however, be located elsewhere in the conduit or in the chamber 11.

I have found that by this arrangement, the temperature in the chamber 11 may be obtained constant within one quarter of a degree centigrade. The accuracy of the control of temperature arises from the fact that both the heating and cooling elements are in constant operation so that there are no inertia effects such as occur when a heating element is turned on and off. Furthermore, the volume of air in the conduit 12, and particularly in the portion of the conduit in which the cooling elements 16 are located, is very small compared to the volume of the air in the chamber 11 so that the change of temperature in the chamber 11 on opening or closing the dampers 20 is very small. The thorough mixing of the varying-temperature air stream from the conduit 12 and the air stream at the temperature of the chamber from the conduit 13 maintains an even temperature in the chamber 11.

What I claim is:

A device for storing biological materials comprising an insulating casing enclosing a storage chamber and means located wholly outside the chamber for maintaining an accurately-controlled constant temperature throughout the chamber, such means comprising a U-shaped conduit extending between spaced points of one wall of the chamber and having a volume many times less than that of the chamber, a cooling element, a constantly-operated electrically heated element and a thermostat in the conduit, a by-pass extending around the cooling element only, a damper controlled by the thermostat for opening and closing the by-pass, a blower located in the conduit beyond the by-pass and in advance of the thermostat and having its discharge directed towards the chamber to cause a rapid stream of temperature-controlled air to enter the chamber, and means for distributing the temperature-controlled air throughout the storage space, comprising a U-shaped conduit extending between spaced points of the opposite wall of the chamber and a blower in the second conduit having its discharge directed into the chamber and adapted to cause a rapidly flowing stream of residual air from the chamber to enter the chamber and impinge against the stream of temperature-controlled air to set up turbulence within the storage chamber.

THURLOW M. GORDON, Jr.

References Cited in the file of this patent

UNITED STATES PATENTS

| Number | Name | Date |
|---|---|---|
| 843,909 | Peter et al. | Feb. 12, 1907 |
| 1,859,613 | Bailey | May 24, 1932 |
| 2,019,472 | Lithgow et al. | Oct. 29, 1935 |
| 2,221,127 | Bates | Nov. 12, 1940 |
| 2,262,243 | Lord | Nov. 11, 1941 |
| 2,465,389 | Morris | Mar. 29, 1949 |
| 2,474,441 | Sparrow | June 28, 1949 |
| 2,510,952 | Brewster | June 13, 1950 |